(12) United States Patent
Decker et al.

(10) Patent No.: US 11,971,059 B2
(45) Date of Patent: Apr. 30, 2024

(54) STRUCTURE AND METHOD FOR SECURING LAYERS OF ROOFING MATERIALS

(71) Applicant: Decker Hall Innovations, LLC, Wellston, OK (US)

(72) Inventors: Andrea L. Decker, Wellston (CA); Reba G. Hall, Neptune Beach, FL (US)

( * ) Notice: Subject to any disclaimer, the term of this patent is extended or adjusted under 35 U.S.C. 154(b) by 445 days.

(21) Appl. No.: 17/114,084

(22) Filed: Dec. 7, 2020

(65) Prior Publication Data

US 2022/0178397 A1 Jun. 9, 2022

(51) Int. Cl.
*F16B 15/00* (2006.01)
*F16B 15/02* (2006.01)
*F16B 15/04* (2006.01)

(52) U.S. Cl.
CPC .......... *F16B 15/04* (2013.01); *F16B 15/0015* (2013.01); *F16B 15/0023* (2013.01); *F16B 15/02* (2013.01); *F16B 2015/0076* (2013.01)

(58) Field of Classification Search
CPC .. F16B 15/04; F16B 15/0015; F16B 15/0023; F16B 15/02; F16B 2015/0076
See application file for complete search history.

(56) References Cited

U.S. PATENT DOCUMENTS

| | | | |
|---|---|---|---|
| 1,039,531 A | 9/1912 | Hartley | |
| 1,075,911 A | 10/1913 | Gobin | |
| 1,428,111 A | 9/1922 | Frank | |
| 1,548,456 A | 8/1925 | Goodman | |
| 3,519,704 A * | 7/1970 | Maginnis | F16B 13/085 264/267 |
| 3,878,756 A * | 4/1975 | Hallock | F16B 15/04 411/922 |
| 4,456,416 A | 6/1984 | Schlein | |
| 4,611,964 A * | 9/1986 | Schlein | E04D 3/3603 411/21 |
| 4,977,720 A * | 12/1990 | Kuipers | B29C 66/21 52/410 |
| 5,125,779 A * | 6/1992 | Hallock | F16B 15/04 411/461 |
| 5,636,953 A * | 6/1997 | Jaeger | F16B 37/043 411/36 |
| 6,095,737 A * | 8/2000 | Barker | F16B 15/04 411/479 |
| 6,233,889 B1 * | 5/2001 | Hulsey | E04D 5/148 52/302.1 |

(Continued)

*Primary Examiner* — Gary W Estremsky (57) ABSTRACT

A roofing fastener has an anchor plate, a staple, and a hollow shank extending perpendicularly away from the anchor plate. The staple is insertable within the hollow shank, and one or more free ends of the staple is extendable from an opening in a free end of the hollow shank. The anchor plate has a raised bonding surface with adhesive and heat sinks dispersed thereabout. The anchor plate and hollow shank may be separable or a single connected structure. In operation, the roofing fastener is inserted within a substructure about the hollow shank, such that the anchor plate rests atop an upper surface of the substructure. The staple is then depressed within the hollow shank such that one or more free ends of the staple penetrate the substructure at an angle relative to the hollow shank. A single-ply membrane is welded to the anchor plate via the adhesive.

14 Claims, 9 Drawing Sheets

(56) References Cited

U.S. PATENT DOCUMENTS

| | | | |
|---|---|---|---|
| 6,640,511 B1* | 11/2003 | Link | E04D 3/3603 52/410 |
| 7,390,156 B1* | 6/2008 | Barker | F16B 15/04 411/479 |
| 7,779,592 B2* | 8/2010 | Bernardi | E04D 3/3603 411/545 |
| 8,763,332 B2* | 7/2014 | Shadwell | E04D 5/145 411/533 |
| 9,309,911 B1* | 4/2016 | Powell | E04D 5/145 |
| 10,190,616 B2* | 1/2019 | MacDonald | F16B 25/103 |
| 2005/0196253 A1* | 9/2005 | Nebesnak | F16B 35/06 411/480 |
| 2007/0175170 A1* | 8/2007 | Shah | E04D 5/147 52/741.1 |
| 2009/0007514 A1* | 1/2009 | Kassem | E04D 5/145 52/410 |
| 2010/0031595 A1* | 2/2010 | Kelly | E04D 5/143 52/746.11 |

* cited by examiner

STRUCTURE AND METHOD FOR SECURING LAYERS OF ROOFING MATERIALS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates generally to the installation of roofing materials onto a building roof or similar structure, and more specifically to a system and method of securing multiple layers of roofing material onto a building roof. The invention more particularly relates to a fastener and method of utilizing such a fastener in securing a single-ply roofing material layer to a poured lightweight concrete deck, gypsum deck or cementitious wood decking.

Brief Discussion of the Prior Art

Modern-day roofs of commercial buildings are often built using layers of various materials held together to produce a flat surface that is resistant to wind, lightweight, and fire resistant. Such commercial roofs generally begin with a structural deck attached to cross-beams of the building below. The structural deck can be a flat metal surface constructed through multiple metal panels attached to the cross-beams, or it can be a more complex system, such as a sub-purlin system, with corrugated metal sheets secured between cross-beams underneath and struts placed above and across multiple corrugated sheets.

An insulating layer is then laid across the structural deck. The insulating layer can be a gypsum deck system or a lightweight insulating concrete roof (LWIC) system. Gypsum and cementitious wood decks are their own deck and insulation. For the gypsum roof, a layer of form board, such as fiberglass or sheetrock, is laid down over the structural deck, and a layer of galvanized wire mesh is installed over the formboard to provide tensile strength to downward load characteristics of the gypsum. Gypsum concrete is then poured over the formboard and wire mesh, typically at a minimum of 2 inches. In the LWIC system, a thin layer of insulating concrete, typically called a slurry, is prepared on-site and poured over the structural deck. Boards of expanded polystyrene insulation are then embedded in the slurry. The slurry is left to harden, holding the insulation in place, after which another 1-2 inch layer of slurry is poured over the insulation. Once that top layer of slurry is secure, the roofer can adhere or fasten the top layer of roofing material. Cementitious wood decks may or may not have attached insulation. The planks are secured to the metal bar joists with approved fasteners.

The top layer is typically a single-ply membrane consisting of synthetic materials. The single-ply membrane is typically either fastened mechanically, welded to intermediate fasteners, ballasted to a roof, or affixed to the insulation that forms a protective layer on a flat roof surface. Single-ply membrane materials include Thermoplastic Polyolefin (TPO) materials and Ethylene Propylene Diene Terpolymer (EPDM) materials. Specific insulation is used in the insulating layer of the roof with specific types of single-ply membrane materials. With TPO materials, Polyisocyanurate (or "Polysio"), Expanded Polystyrene (or "EPS"), and Extruded Polystyrene (or "XPS") are used as part of the insulating layer. The other material, Ethylene Propylene Diene Terpolymer (EPDM), is also used on low slope commercial roofs. However, TPO materials are often attached to insulating layers via welding, whereas EPDM layers are typically pre-adhered or adhered through liquid adhesives or specially formulated tape.

Induction anchor plates for securing single-ply membranes through welding are taught in U.S. Pat. No. 6,640,511 to Link. Link teaches a circular plate with an elevated bonding platform and enlarged central countersink to accommodate the head of a fastening screw, such that a head of the screw does not protrude above a top profile of the anchor plate when secured to a substructure. A layer of adhesive is provided along the bonding platform to secure the anchor plate to a single-ply membrane laid over the anchor plate. The screw connects the anchor plate to a structural layer, typically a metal sheet, thus connecting the single-ply membrane to the insulating layer and structural layer. However, this anchor plate requires a corresponding hole in the structural layer to be pre-drilled before the anchor plate can be installed. Further, the slurry or gypsum concrete of the insulating layer must be completely set, or risk seeping through the pre-drilled holes in the structural layer.

U.S. Pat. No. 6,095,737 to Barker et al. provides another example of an anchor plate fastener that utilizes a staple inserted into a hollow shank. The staple is spread by the shank, and free ends of the staple perpendicularly exit a free end of the shank to help vertically secure the anchor plate in a substructure. This anchor plate is not used with induction welding, as adhesive is not provided along a bonding surface.

At the time of this invention, the inventors are unaware of any roofing fasteners for induction welding single-ply roofing membrane to a substructure, where the roofing fastener has at least adhesive along a bonding surface and a shank and staple structure to insert into and secure the roofing fastener to a substructure without need for pre-drilling through a structural layer.

In the roofing industry, it is critical that fasteners be easily installed with minimum work effort and yet remain rigidly anchored once in place. Any back-out of the fasteners can result in damage to the roof and expensive maintenance problems. In areas where high wind conditions exist, such as in areas where hurricane wind forces can be expected, winds can destroy a roof if the fasteners fail to provide sufficient retention force to secure the roofing materials. For this reason, fasteners utilized in the roofing industry are tested and must be approved for use by regulatory agencies. As such, a fastener that meets the required performance and safety requirements, without the timely and costly need for pre-drilling through a structural layer, would be highly beneficial to the art Other examples of roofing fasteners are disclosed in U.S. Pat. No. 4,456,416 to Schlein and U.S. Pat. No. 4,611,964 to Schlein. Other examples of fasteners which incorporate a generally hollow body through which a wire staple may be driven are disclosed in U.S. Pat. No. 1,039,531 to Hartley, U.S. Pat. No. 1,075,911 to Gobin, U.S. Pat. No. 1,428,111 to Molesworth and U.S. Pat. No. 1,548,456 to Goodman. However, such fasteners are not designed for use in the roofing industry.

Therefore, there is a need in the art to improve processes by which such roofing materials are installed and secured, and to improve fasteners used in such processes.

BRIEF SUMMARY OF THE INVENTION

The present disclosure provides for multiple embodiments of an induction roofing fastener and a method for installing a single-ply roofing layer using the induction roofing fastener.

A preferred embodiment of the induction roofing fastener, includes an anchor plate having a raised bonding surface and an adhesive layer atop the bonding surface; a staple having two or more free ends oriented in a same direction; and a hollow shank contacting, and extending perpendicularly away from, the anchor plate and having one or more openings along a free end, wherein a plurality of heat sink orifices are provided along the bonding surface, wherein the staple is insertable within a hollow portion of the hollow shank and the two or more free ends of the staple are extendable through the one or more openings along the free end of the hollow shank.

An alternate embodiment of the induction roofing fastener is taught, wherein the anchor plate has a depressed contact surface oppositely oriented to the raised bonding surface.

An alternate embodiment of the induction roofing fastener is taught, wherein the depressed contact surface is provided on a depressed portion of the anchor plate, and the raised bonding surface is provided on a raised portion of the anchor plate, wherein the raised portion is connected to the depressed portion by a sloped portion of the anchor plate.

An alternate embodiment of the induction roofing fastener is taught, wherein a plurality of heat sink orifices are provided along the sloped portion.

An alternate embodiment of the induction roofing fastener is taught, wherein raised bonding surface includes at least a central bonding surface and a peripheral bonding surface, the central bonding surface being coaxial with the peripheral bonding surface.

An alternate embodiment of the induction roofing fastener is taught, further having an opening in the anchor plate being contiguous with the hollow portion of the hollow shank and continuous with the one or more openings of the hollow shank.

An alternate embodiment of the induction roofing fastener is taught, wherein the anchor plate and hollow shank form a single structure.

An alternate embodiment of the induction roofing fastener is taught, further having a central opening in the anchor plate; an insertion opening along a connection end of the hollow shank, the connection end oriented oppositely from the free end along a longitudinal length of the hollow shank; and a flange arranged around the insertion opening, wherein the hollow shank is insertable through the central opening of the anchor plate about the free end and securable to the anchor plate about the flange.

An alternate embodiment of the induction roofing fastener is taught, wherein the staple is insertable within the hollow portion of the hollow shank through the insertion opening.

An alternate embodiment of the induction roofing fastener is taught, further having a piercing surface along the free end of the hollow shank.

An alternate embodiment of the induction roofing fastener is taught, further having a bifurcation surface within the hollow portion oriented toward the free end of the hollow shank.

A preferred embodiment of the method of installing a single-ply roofing layer to a substructure includes inserting an induction roofing fastener into a substructure layer without piercing a structural layer, the induction roofing fastener comprising an anchor plate having a raised bonding surface and an adhesive layer atop the bonding surface; a staple having two or more free ends oriented in a same direction; and a hollow shank contacting, and extending perpendicularly away from, the anchor plate and having one or more openings along a free end, wherein a plurality of heat sink orifices are provided along the bonding surface, wherein the staple is insertable within a hollow portion of the hollow shank and the two or more free ends of the staple are extendable through the one or more openings along the free end of the hollow shank; depressing the staple within the hollow portion of the hollow shank such that the two or more free ends of the staple are extended through the one or more openings along the free end of the hollow shank and into the substructure layer; covering the anchor plate with the single-ply roofing layer such that the adhesive layer contacts the single-ply roofing layer; applying heat to a portion of the single-ply roofing layer directly covering the anchor plate; and allowing heat to dissipate from the heat sink orifices to bond the single-ply roofing layer and anchor plate together.

An alternate embodiment of the method is taught, wherein the single-ply roof layer partially melts within each heat sink orifice as heat is allowed to dissipate.

An alternate embodiment of the method is taught, wherein the induction roofing fastener is inserted into a substructure layer that is not fully set.

An alternate embodiment of the method is taught, further including, after depressing the staple within the hollow portion, allowing the substructure layer to fully set before covering the anchor plate with the single-ply roofing layer.

An alternate embodiment of the method is taught, further including, after depressing the staple within the hollow portion, covering the anchor plate with the single-ply roofing layer before the substructure layer is fully set.

An alternate embodiment of the method is taught, wherein the substructure is a homosote deck, an autoclaved concrete deck, a cementitious wood deck, a lightweight insulating concrete deck, or a gypsum deck.

An alternate embodiment of the method is taught, wherein the induction roofing fastener further comprises an opening in the anchor plate being contiguous with the hollow portion of the hollow shank and continuous with the one or more openings of the hollow shank.

An alternate embodiment of the method is taught, wherein the induction roofing fastener further includes a central opening in the anchor plate; an insertion opening along a connection end of the hollow shank, the connection end oriented oppositely from the free end along a longitudinal length of the hollow shank; and a flange arranged around the insertion opening, wherein the hollow shank is insertable through the central opening of the anchor plate about the free end and securable to the anchor plate about the flange.

An alternate embodiment of the method is taught, wherein the induction roofing fastener further includes a piercing surface along the free end of the hollow shank; and a bifurcation surface within the hollow portion oriented toward the free end of the hollow shank.

A better understanding of the embodiments of the method will be had with reference to the several views of the drawings, described herein.

BRIEF DESCRIPTION OF THE SEVERAL VIEWS OF THE DRAWING

The present invention is shown and described in the following drawings.

A better understanding of the embodiments of the method will be had with reference to the detailed description, described herein.

DETAILED DESCRIPTION OF THE INVENTION

In the following detailed description, embodiments for installing multiple layers of roofing materials are described by providing reference to the accompanying drawings which form a part of the description of how the invention works. The accompanying drawings do not limit the scope of the present invention. The present invention solves the problems associated with ballasting multiple layers of roofing materials with removable objects by instead inserting a plurality of double-sided fasteners between each layer of roofing material whereby ballasting objects are no longer required.

It will be appreciated that for simplicity and clarity of illustration, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

As referred to herein, "substructure" relates to materials of a structural deck and/or insulating layer as they are customarily installed in the art, typically in layers, notwithstanding specific differences in application described herein. The substructure may be a single layer of material, notwithstanding multiple layers shown in the drawings through different shading, or may be multiple layers of the same or different materials. Gypsum and cementitious wood deck substructures are their own structural deck and insulating layer. The substructures shown throughout the drawings, and referenced herein as the substructure 4, are exemplary only and do not limit application of the fastener or method embodiments to a specific layering or composition of materials.

As referred to herein, "single-ply membrane," "single-ply layer," or "single-ply roofing material," all refer to a synthetic roofing layer used to form a top layer of a finished roof, typically a thermoplastic commercial roof.

Figure 1:
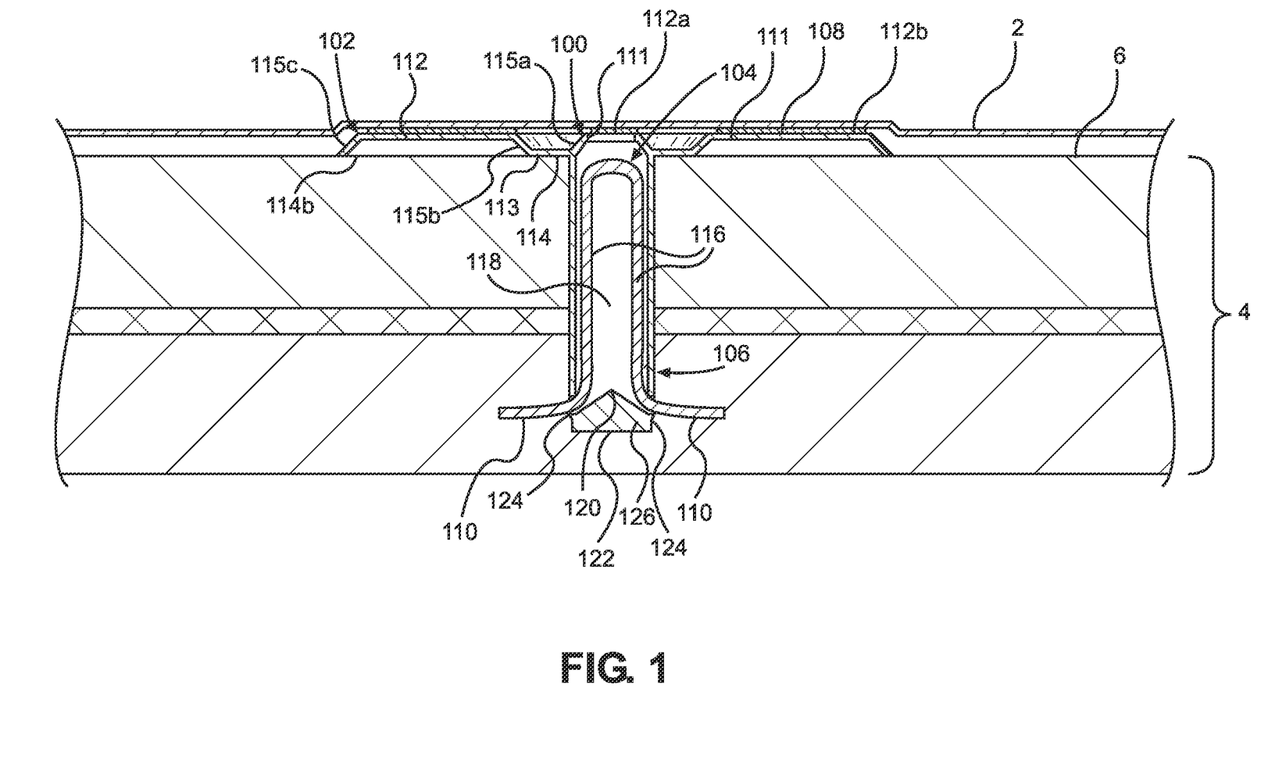
FIG. 1 is a cross-sectional illustration of an induction fastener according to an embodiment of the present invention inserted through several layers of substructure.

An illustration of an induction roofing fastener 100, according to an embodiment of the present invention, is shown in FIG. 1. The induction roofing fastener 100 has been installed in a substructure 4 according to an embodiment of a method for securing a single-ply membrane 2 to the substructure 4.

The induction roofing fastener 100 includes an anchor plate 102, a staple 104, and a hollow shank 106. The hollow shank 106 vertically penetrates the substructure 4 such that the anchor plate 102 rests along an upper surface 6 of the substructure. An adhesive layer 108 secures the anchor plate 102 to the single-ply membrane 2. The anchor plate 102 and hollow shank 106 are further mechanically secured together.

The staple 104 secures the hollow shank 106 in the substructure 4 along one or more free ends 110. Two free ends 110 are included in this embodiment of the fastener 100, however a different number of free ends may be used as desired and conformable with the size and shape of the hollow shank 106.

The anchor plate 102 includes one or more raised bonding surfaces 112 upon which the adhesive layer 108 is deposited or held. The fastener 100 of FIG. 1 includes a central bonding surface 112a and a peripheral bonding surface 112b, which are coaxial in this embodiment. Other embodiments of the fastener 100 may have a raised bonding surface 112 only at a location corresponding to the central bonding surface 112a, at a location corresponding to the peripheral bonding surface 112b, one or more intermediate bonding surfaces between the central bonding surface and peripheral bonding surface, or one or more bonding surfaces peripheral to the peripheral bonding surface. While it is not necessary for each raised bonding surface 112 to have the adhesive layer applied 108 to thereto, or for the entire bonding surface to be covered by the adhesive layer, it is preferred for creating a strong bond between the fastener 100 and single-ply membrane 2.

The anchor plate 102 also includes one or more depressed contact surfaces 114 upon which the anchor plate contacts the upper surface 6 after full insertion of the hollow shank 104 in the substructure 4. The fastener 100 of FIG. 1 includes a central contact surface 114a and a peripheral contact surface 114b, which are coaxial in this embodiment. Other embodiments of the fastener 100 may have a depressed contact surface 114 only at a location corresponding to the central contact surface 114a, at a location corresponding to the peripheral contact surface 114b, one or more intermediate contact surfaces between the central contact surface and peripheral contact surface, or one or more contact surfaces peripheral to the peripheral contact surface. To meet roofing performance and safety requirements, it is preferred if each contact surface 112 fully rests against the upper surface 6 upon successful installation of the fastener 100 in the substructure 6.

Each raised bonding surface 112 is part of a raised portion 111 of the anchor plate 102. The raised portion 111 includes a thickness and two oppositely oriented surfaces, of which the raised bonding surface is one of the two oppositely oriented surfaces. A depressed portion 113 of the anchor plate 102 has its own thickness and two oppositely oriented surfaces, the depressed contact surface 114 being one of those two surfaces. A sloped portion 115 extends from or between the raised portion 111 and/or depressed portion 113. For example, in the anchor plate 102 of FIG. 1, three sloped portions 115a, 115b, and 115c, are provided. Sloped portions 115a and 115b both extend between a raised portion 111 and a depressed portion 113. However, sloped portion 115c only extends from a raised portion 111. Further, sloped portion 115c includes a depressed contact surface 114b. The sloped portion therefore has a thickness with at least two oppositely oriented sides across the thickness, but may also include a side along the thickness, as with sloped portion 115c in FIG. 1.

The staple 104 of the fastener 100 in the FIG. 1 embodiment is generally U-shaped, with two connected longitudinal lengths 116 extending in the same direction. The free ends 110 are shown in FIG. 1 angled relative to the longitudinal lengths 116. However, the free ends 110 will preferably not be angled (i.e. have an angle of 0°) relative to the longitudinal lengths 116 before being inserted into the hollow shank 106.

The hollow shank 106 has a hollow portion 118 extending longitudinally from the anchor plate 102 to an oppositely oriented end of the hollow shank 106. A bifurcation surface 120 may be positioned within the hollow portion 118 along a surface toward a free end 122 of the hollow shank 106. Openings 124 in the hollow shank 106 connect the hollow portion 118 with an external environment and are shaped to permit one or more free ends 110 of the staple 104 to exit the hollow portion along with a portion of the longitudinal length 116. The bifurcation surface 120 is preferably angled to help direct the free ends 110 through a corresponding opening 124, and to assist in causing the each free end to be angled in relation to a parallel portion of the longitudinal lengths 116 contained within the hollow portion 118. The free end 126 of the hollow shank 106 may also have an external piercing surface for aiding penetration of the hollow shank through the substructure 6.

Figure 2:
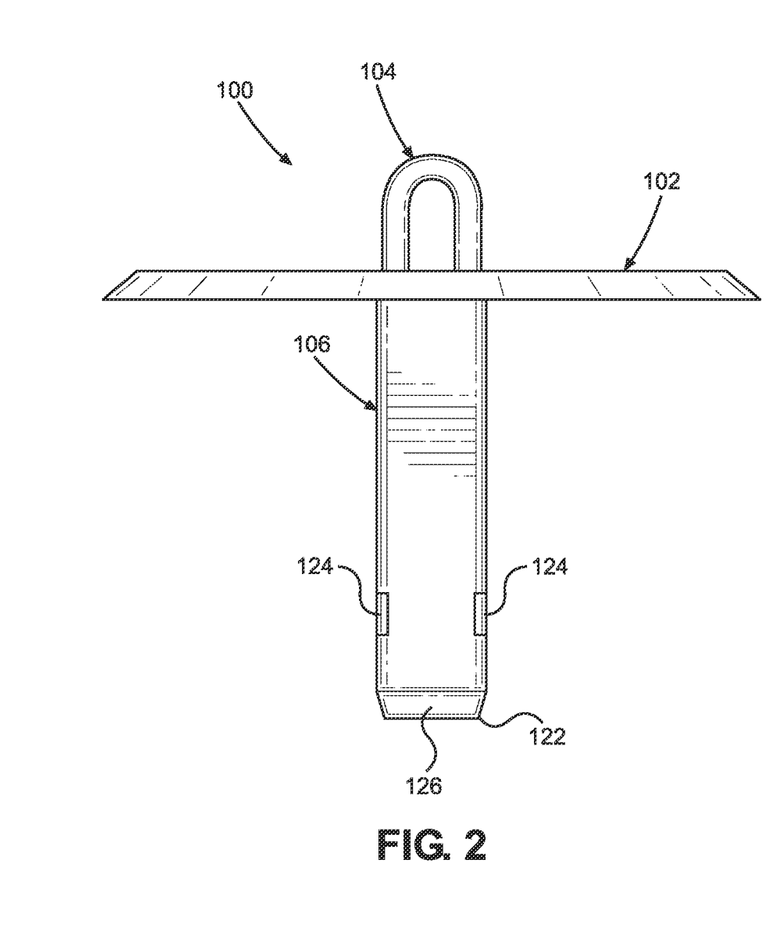
FIG. 2 is a side view of a preferred embodiment of the induction fastener in an insertion position.
Figure 3:
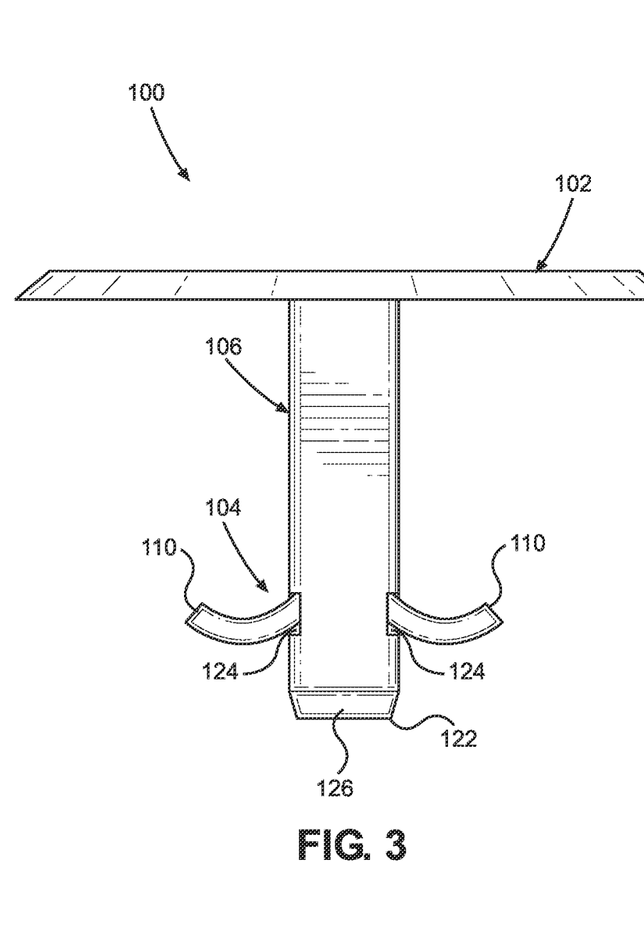
FIG. 3 is a side view of the induction fastener of FIG. 2 in a locked position.
Figure 4A:
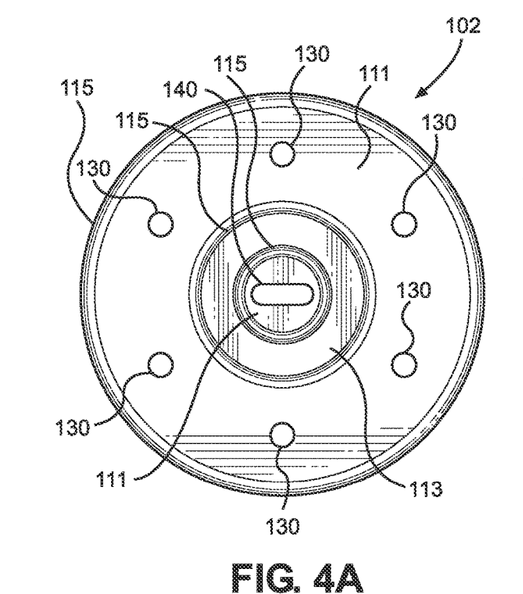
FIG. 4A is top view of a preferred embodiment of an anchor plate of the induction fastener.
Figure 4B:
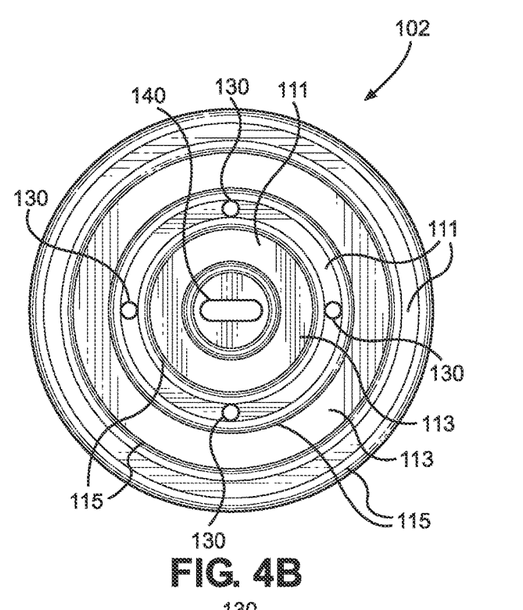
FIG. 4B is top view of an alternate embodiment of the anchor plate of the induction fastener.
Figure 4C:
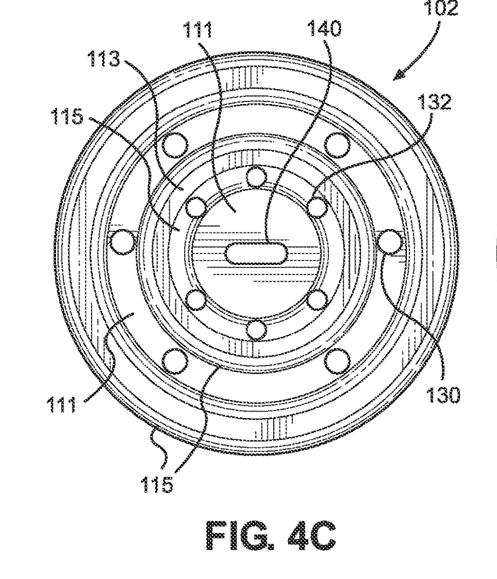
FIG. 4C is top view of an alternate embodiment of the anchor plate of the induction fastener.
Figure 4D:
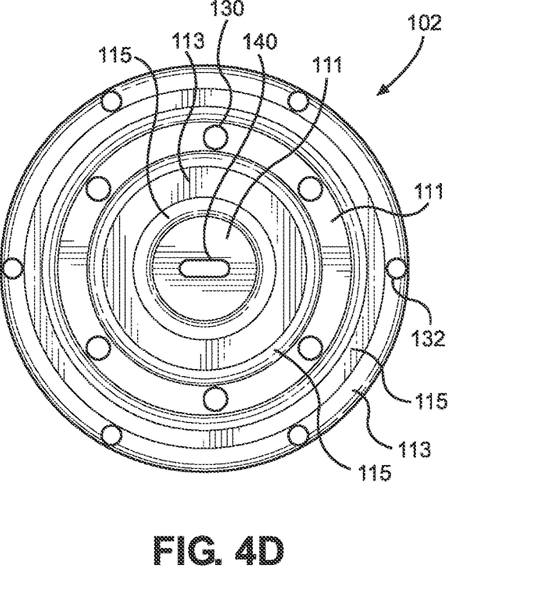
FIG. 4D is top view of an alternate embodiment of the anchor plate of the induction fastener.
Figure 5:
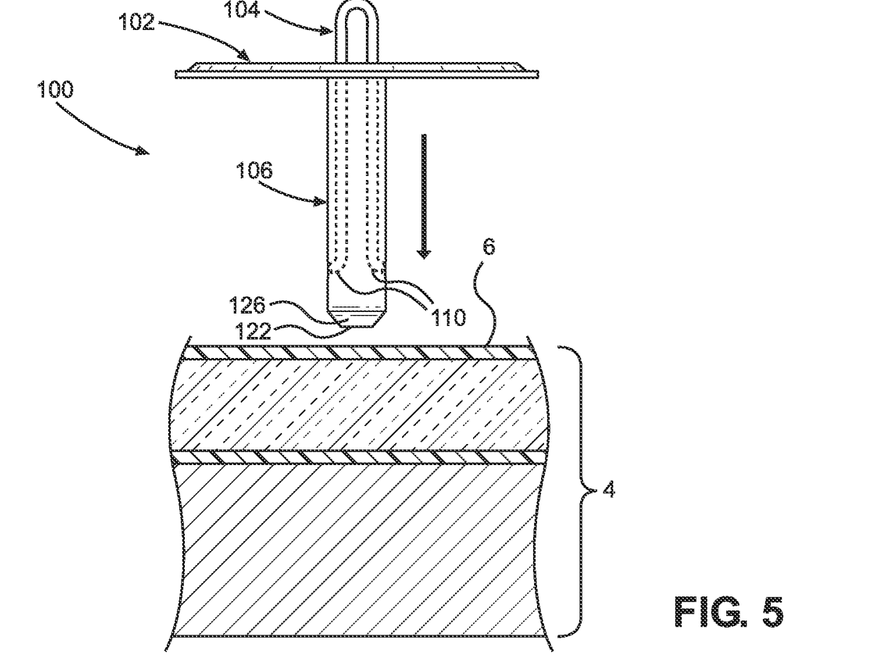
FIG. 5 is an illustration of a first step of a method for securing a single-ply membrane to a substructure using an induction fastener embodiment of the present invention.

FIGS. 2 and 3 illustrate an identical embodiment of the induction roofing fastener 100 in different configurations. FIG. 2 shows the fastener 100 in an insertable, or initial, configuration, where the staple 104 is positioned wholly partially inserted into the hollow shank 106 without extending through the one or more openings 124. The initial position may also include the staple 104 wholly out of the hollow shank 106. The defining characteristic of the insertable configuration is that the free ends 110 of the staple 104 are still within the hollow portion 118 of the hollow shank 106 and have not yet passed through the opening 124.

An inserted, or installed, position of the fastener 100 is illustrated in FIG. 3. In this position, free ends 110 of the staple 104 have exited the openings 110 and extend away from the hollow shank 106. Typically, the hollow shank 106 will have been inserted into a substructure along the free end 122 with aid of the piercing surface 126 and the anchor plate will be situated on top of the substructure in this configuration. The defining characteristic of the inserted configuration is that the free ends 110 of the staple 104 extend away from the hollow shank 106 through the openings 124 to form a lateral support, being a length of the staple between each free end and the hollow shank.

Various embodiments of the anchor plate 102 are provided in FIGS. 4A-4D. All embodiments of the anchor plate have at least one raised portion 111 having a raised bonding surface 112, at least one depressed portion 113 having a depressed contact surface 114, and at least one sloped portion 115 connecting the at least one raised portion to the at least one depressed portion. In the embodiments provided in FIGS. 4A-4D, the anchor plate 102 is not removably secured to the hollow shank 106, as provided in an alternate embodiment of FIG. 11, so all shown embodiments also have an opening 140 in the anchor plate 102 contiguous with the hollow shank. The opening 140 is also continuous with the hollow portion 118 and openings 110 of the hollow shank 106. The opening may be located along a raised portion 111, as provided, or may be located along a depressed portion 113.

The anchor plate 102 embodiments provide different orientations and numbers of raised, depressed, and sloped portions 111, 113, 115. It should be understood that these embodiments are only exemplary and do not limit the possibilities of different orientations of such structures. The anchor plate 102 also need not be circular in shape and may be other shapes capable of providing the described bonding surface 112 and contact surface 114. The circular shape of the anchor plate 102 is simply preferable in terms of ease of manufacturing.

Each anchor plate 102 embodiment also includes one or more heat sink orifices in one or more raised portions 111. The heat sink orifices allow heat to dissipate between the upper surface 6 and anchor plate 102 after heat application to the adhesive layer during installation of the fastener 100. One or more secondary heat sink orifices 132 may be located along sloped portions 115 to provide additional heat dissipation properties and mechanical attachment points, as discussed further relative to embodiments of the method for securing the single-ply membrane 2 using the fastener 100.

FIGS. 5-10 show a method of installing the induction roofing fastener 100 and securing a single-ply membrane 2 to the fastener, thereby attaching the single-ply membrane to a substructure 2. First, a fastener 100 in the insertable position is oriented with the free end 122 and piercing end 126 of the hollow shank 106 toward the upper surface 6 of the substructure 4. For best practice to ensure proper installation, the fastener 100 should preferably be oriented such that the anchor plate 102 is parallel to the upper surface 6 and the hollow shank 106 is perpendicular to the upper surface. Free ends 110 of the staple 104 should not protrude past the openings 124 in the hollow shank 106.

Figure 6:
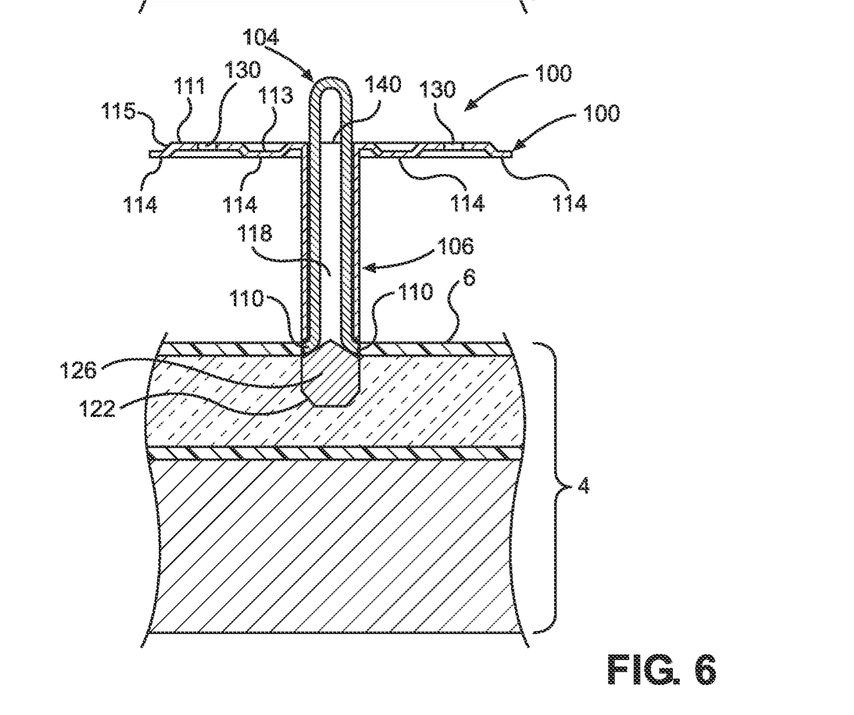
FIG. 6 is an illustration of a subsequent step to FIG. 5 along a cross-section of the preferred induction fastener embodiment and a substructure as the induction fastener is partially inserted into the substructure.

Next, as shown in FIG. 6, the free end 122 of the hollow shank 106 pierces the upper layer 6 of the substructure 4 along the piercing end 126. The free end 122 further penetrates the substructure, preferably with the hollow shank oriented perpendicularly to the upper layer 6, until the contact surface 114 of the anchor plate contacts the upper layer 6. As in FIG. 5, the free ends 110 of the staple 4 remain in the hollow portion 118 of the hollow shank 106 while the hollow shank penetrates the substructure 4. The piercing surface 126 may have one or more angled surfaces to create an overall structure that reduces force necessary to insert the hollow shank into the substructure. The dimensions of the free end 122 along the piercing surface 126 may vary as necessary to provide a preferable structure to accommodate insertion of the hollow shank 106 into one or more material layers in the substructure 4.

While insertion of the hollow shank 106 in FIG. 6 may occur once the substructure 4 is fully set, the structure of the hollow shank advantageously allows it to be optionally installed before the substructure is fully set. This allows the fastener to be inserted into a partially set substructure, which then allows the substructure to set around the fastener. Setting around a fastener means less disruption of the substructure 4 underneath the upper layer 6 through insertion of the hollow shank 106 first then free ends 110 later. Current induction fasteners utilize a screw penetrating completely through the structural layer, or basement, of the substructure to be fastened through a sheet of metal. This requires time spent pre-drilling a hole through the substructure after it is fully set before installation of the fastener into the substructure. This in turn requires time to be spent waiting for the substructure to fully set. With the structure of fastener 100, a fully set substructure and pre-drilling is not required. This saves a considerable amount of time during installation, and saves on the equipment necessary to pre-drill holes in the substructure.

Figure 7:
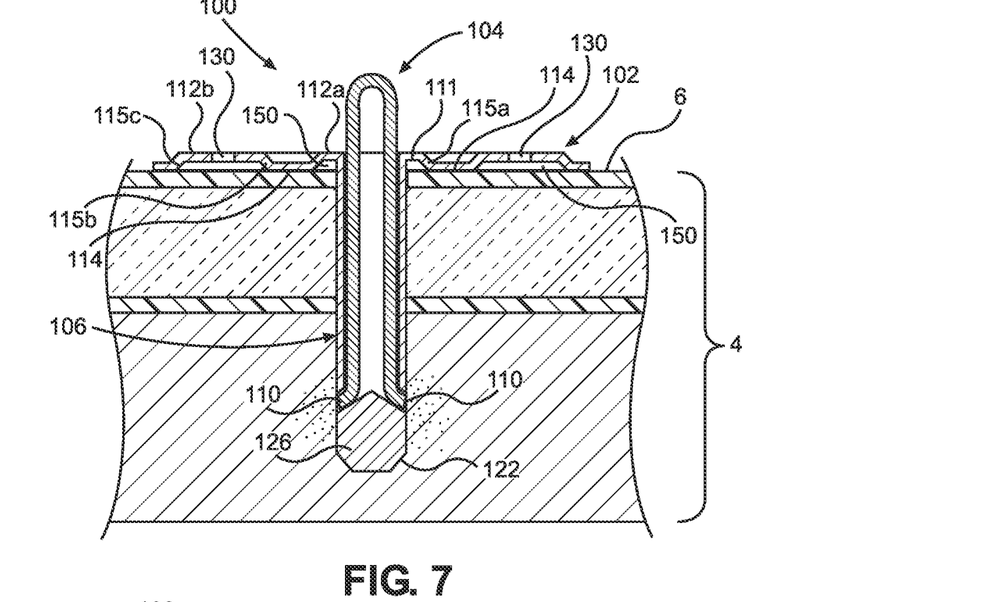
FIG. 7 is an illustration of a subsequent step to FIG. 6 of the method for securing a single-ply membrane to a substructure using an induction fastener embodiment of the present invention.

Full contact between the contact surface 114 and upper layer 6 is shown in FIG. 7. The hollow shank 106 remains perpendicularly oriented to the upper layer, and the anchor plate is oriented parallel to the upper layer. The contact surface 114 of the anchor plate 102 rests along the upper layer. One or more pockets 150 are formed between the upper layer 6 and anchor plate 102. In this embodiment, a pocket 150 is formed between the upper surface 6, hollow shank 106, sloped portion 115a, and interior raised portion 111 corresponding to bonding surface 112a. Another pocket 150 is formed between the upper surface 6, sloped portions 115b and 115c, and the raised portion corresponding to bonding surface 112b.

Figure 8:
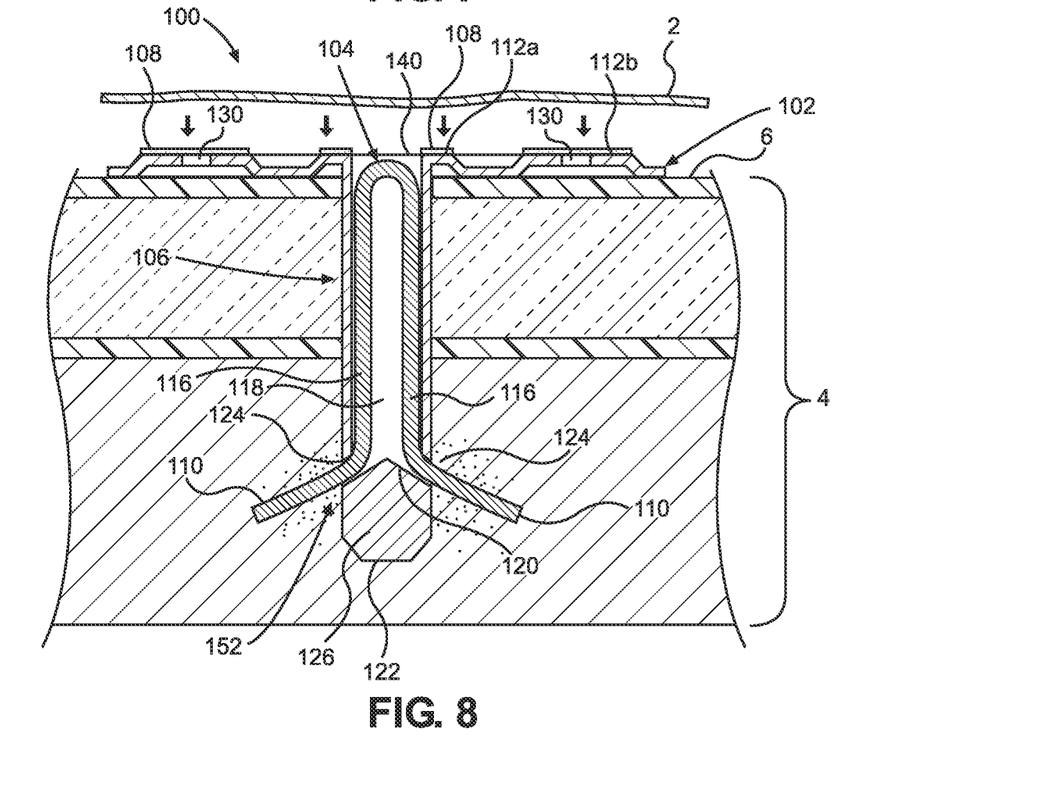
FIG. 8 is an illustration of a subsequent step to FIG. 7 of the method for securing a single-ply membrane to a substructure using an induction fastener embodiment of the present invention.
Figure 9:
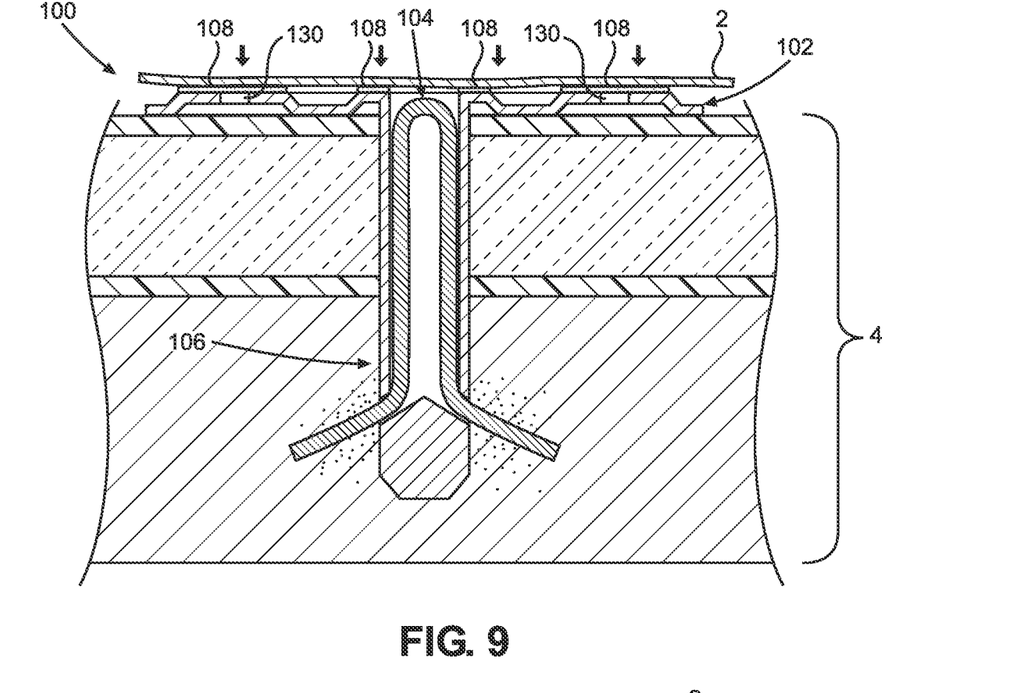
FIG. 9 is an illustration of a subsequent step to FIG. 8 of the method for securing a single-ply membrane to a substructure using an induction fastener embodiment of the present invention.

FIG. 8 shows the next step in the method. The staple 104 is depressed into the hollow portion 118 so that the free ends 110 exit a respective opening 124 in the hollow shank 106 and extend into the substructure 4. The free ends 110 extend from the hollow shank 106 at an angle 152. The bifurcation surface 120, also angled, helps to create this angle 152. The bifurcation surface 120 may be differently sloped to produce a different angle 152. The structure and shape of the hollow portion 118 and openings 124 may also influence the angle 152 and orientation of the free ends 110 as they leave the hollow portion. Once the staple 104 is inserted into the substructure 4 to the desired length of each free end 110, a layer of single-ply membrane 2 is laid over-top the anchor plate 102. The single-ply membrane 2 is preferably laid evenly across the bonding surfaces 112a, 112b and adhesive layer 108 to produce a clean, flat adhesion free of wrinkles or other imperfections.

Heat application follows placement of the single-ply membrane 2 over the fastener 100, shown in FIG. 8. Heat, shown in arrows in FIG. 8, is applied to a portion of the single-ply membrane 2 over-top the anchor plate 102 and fastener 100. The heat application activates the adhesive layer 108 to bond to the single-ply membrane 2.

Figure 10:
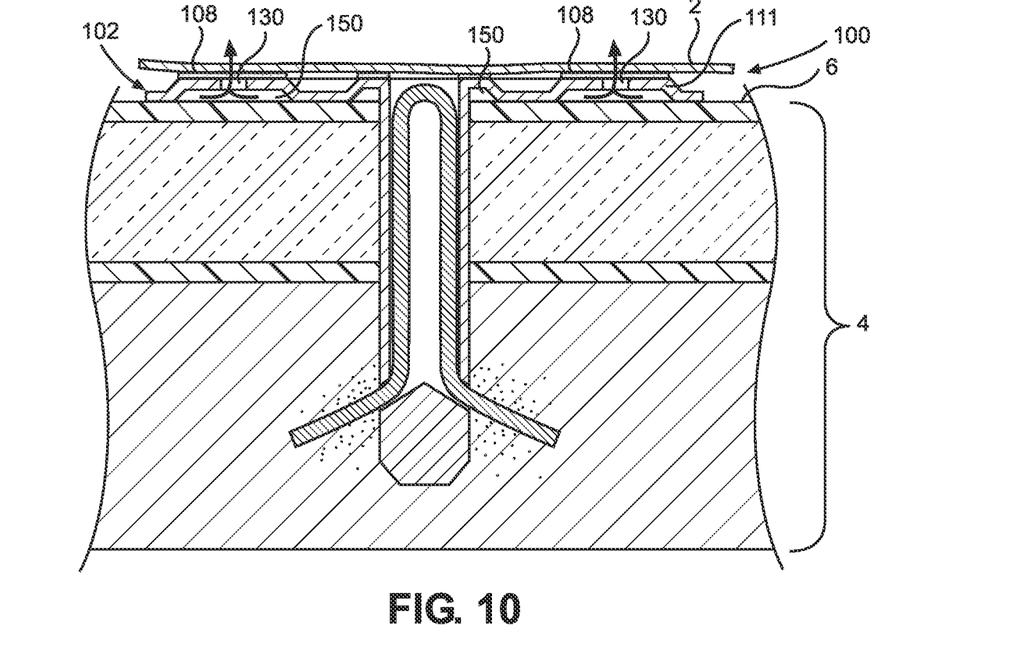
FIG. 10 is an illustration of a subsequent step to FIG. 9 of the method for securing a single-ply membrane to a substructure using an induction fastener embodiment of the present invention.

Finally, in FIG. 10, heat is allowed to dissipate from the pockets 150. Heat, shown again in arrows in FIG. 10, exits the pockets 150 through one or more heat sink orifices 130 in the raised portion of the anchor plate. The inclusion of heat sink orifices allows the single-ply membrane and anchor plate to fully bond together more quickly, saving time across installation of a commercial roof. Further, the single-ply membrane 2 may slightly melt into the heat sink orifices 130. This is desirable, as it provides more contact surface between the single-ply membrane 2 and fastener to resist wind forces that may pick up the single-ply membrane and separate it from the substructure. While the additional benefit provided by the single-ply membrane 2 melting into a single heat sink orifice 130 may be comparatively slight, each fastener 100 as a plurality of heat sink orifices and hundreds or thousands of fasteners may be applied to a given roof depending on the size of the corresponding building.

As previously described, one or more secondary heat sink orifices 132 may be provided in the anchor plate 102. Orifices 132 on the sloped portions 115 provide further heat dissipation and mechanical attachment properties similar to orifices 130. Such secondary heat sink orifices 132 are ideal when there is insufficient surface area along a raised portion 111, but may be provided even if sufficient area exists.

The heat dissipation properties of anchor plates 102 with and without heat sink orifices was tested, and the resulting data is provided in Table 1, below.

TABLE 1

| Time (minutes) | Temperature (Celsius) | |
| --- | --- | --- |
| | With Heat Sink Orifices | Without Heat Sink Orifices |
| 0:00 Min | 136.111 | 140.556 |
| 1:00 Min. | 82.778 | 93.333 |
| 2:00 Min. | 61.111 | 68.333 |
| 3:00 Min. | 47.778 | 52.778 |
| 4:00 Min. | 40.556 | 41.667 |
| 5:00 Min. | Equal | Equal |

An anchor plate 102 with heat sink orifices 130 and another anchor plate without heat sink orifices were placed in an oven for two minutes at 121° C. (degrees Celsius). The heat in the oven was then turned off and the temperature of each anchor plate was taken at the time heat was first removed and then each minute after. At five minutes after removal of the heat, the two anchor plates had reached the same temperature. While the anchor plate with orifices began four degrees cooler than the plate without orifices, the greatest difference in temperature occurred over the first minute. The anchor plate 102 with orifices 130 was 11° C. cooler than the plate without holes. Incremental time savings of even a minute across each fastener add up over the course of installing hundreds or thousands of the fasteners 100 into a substructure.

Figure 11:
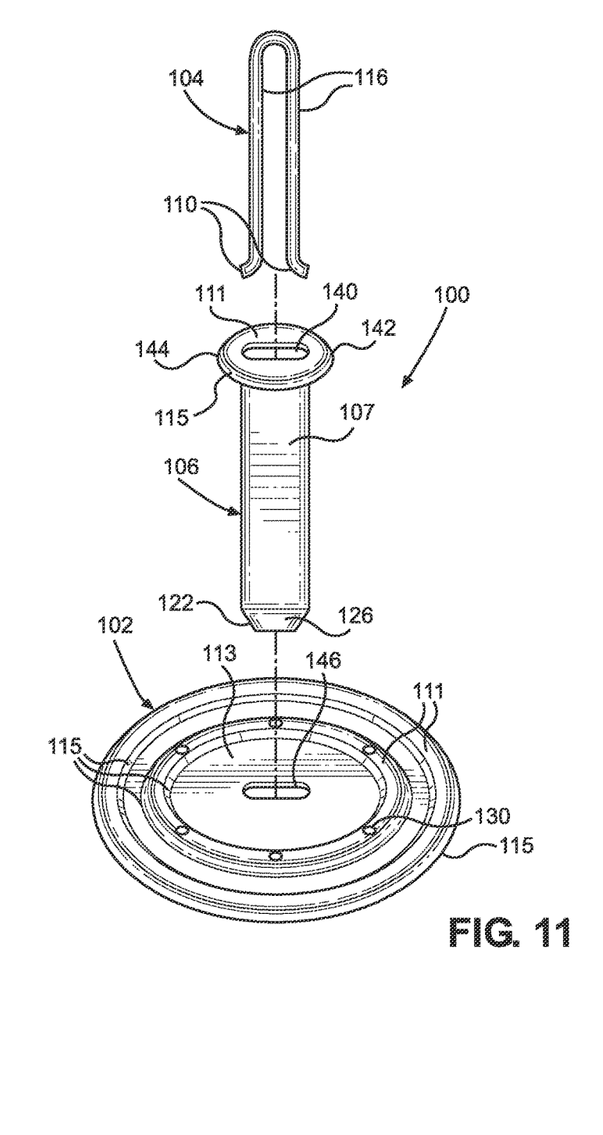
FIG. 11 is an exploded view of an alternate embodiment of the induction fastener having a separable hollow shank and anchor plate.
Figure 12:
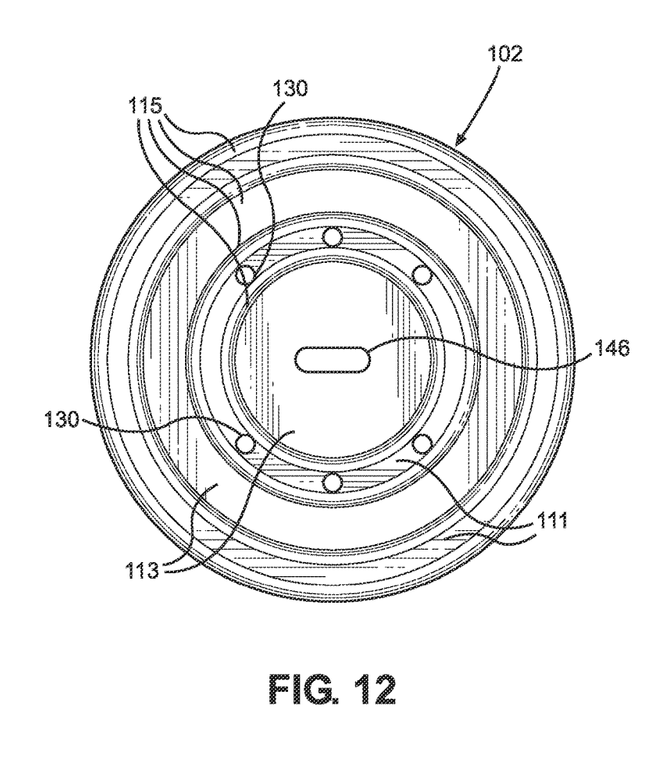
FIG. 12 is a top view of the anchor plate of FIG. 11.

An alternate embodiment of the induction roofing fastener 100 is provided in FIGS. 11-12. This fastener 100 embodiment is similar to the embodiments shown in FIGS. 1-3 and 5-10, except that the hollow shank 106 is separable from the anchor plate 102. The hollow shank 106 further has a flange 142 around an end 144 oppositely oriented to the free end 122 along a length of the hollow shank. Further, the opening 140 is not contiguous between the anchor plate 102 and hollow shank 106, but instead is contiguous with the raised portion 111 of the hollow shank. An opening 146 in the anchor plate corresponds to a shape of a hollow shank body 107 between ends 122 and 144. The free end 122 is insertable, and the body 107 is slidable, through the opening 146. The flange 142 removably secures the hollow shank 106 to the anchor plate.

After installation according to an embodiment of the method described herein, the fastener 100 of FIG. 11 is secured similarly to embodiments where the anchor plate 102 and hollow shank 106 are not separable. The free ends 110 of the staple 104 prevent upward movement of the hollow shank 106. In turn, the hollow shank 106 prevents upward or lateral movement of the anchor plate 102, which is attached to the single-ply membrane 2 along an adhesive layer 108.

The size and shape of the opening 140 in the hollow shank 106 may vary to accommodate insertion of the corresponding staple 104. Likewise, the size and shape of the opening 146 may vary to accommodate insertion of the corresponding hollow shank 106. The body 107 of the hollow shank may vary in size and shape. For example, the body 107 may be rectangular, cylindrical, conical, or polyhedral, as desired. The opening 146 must be shaped to allow the body 107 to be inserted through the opening up to the flange 142, and shaped to prevent the flange from passing through the opening.

Otherwise, the structures, and various alternations of such structures, for the fastener of FIGS. 11-12 remain the same as the embodiments discussed in reference to FIGS. 1-3 and 5-10.

Figure 13:
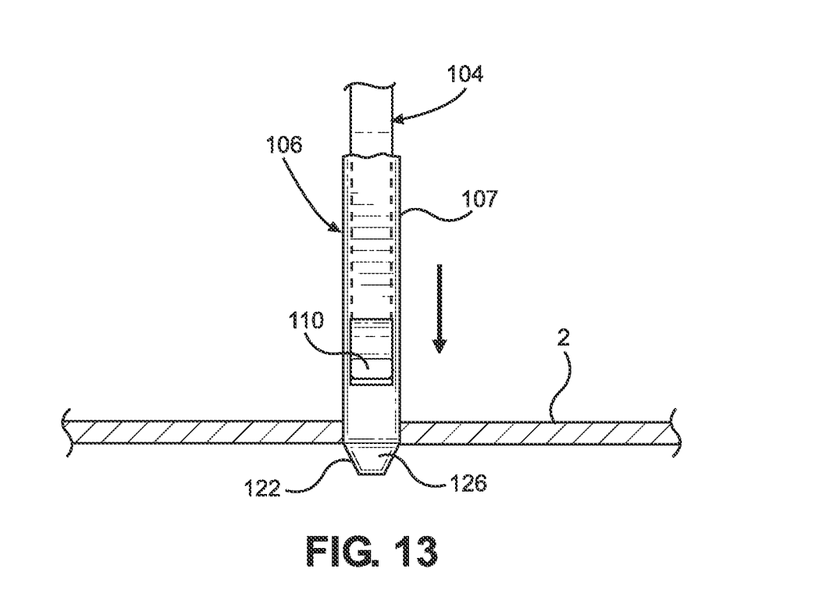
FIG. 13 is a side view of a hollow shank embodiment as it first penetrates the substructure.
Figure 14:
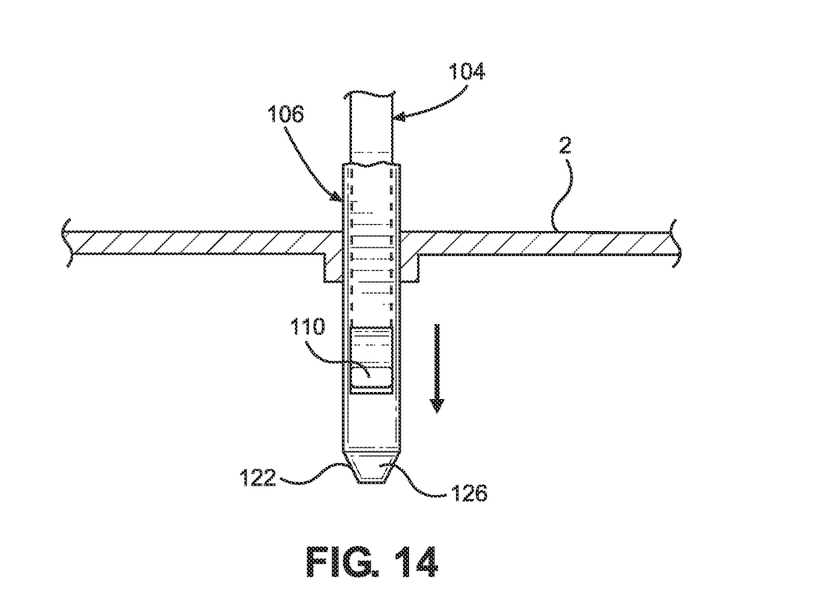
FIG. 14 is a side view of the hollow shank of FIG. 13 as it penetrates the substructure past an opening in a free end of the hollow shank.

FIGS. 13-14 provide a side view along a width of a hollow shank 106 as it penetrates an upper layer 6 of a substructure 4. The body 107 of the hollow shank 106 is rectangular, and the piercing surface 126 is angled to imitate the shape of a blade. The hollow portion 118 is just wide enough to accept the staple 104. This configuration is preferable for inserting the hollow shank 106 into a set substructure. The narrowed body 107 and piercing surface 126 focuses force and pressure along a smaller surface area of the free end 122, allowing easier insertion of the hollow shank 106 into a hardened material. This hollow shank 106 embodiment may be used with any of the fastener 100 embodiments used herein. Further, it is not necessary to use only this configuration of the hollow shank 106 with fully set substructure 4, and this hollow shank configuration may be used with a partially set substructure.

Figure 15:
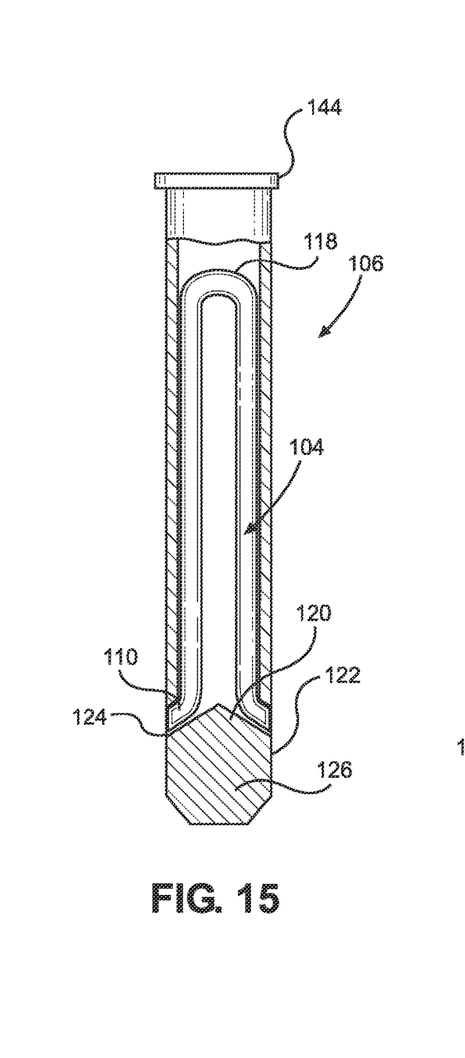
FIG. 15 is an alternate embodiment of the separable shank.
Figure 16:
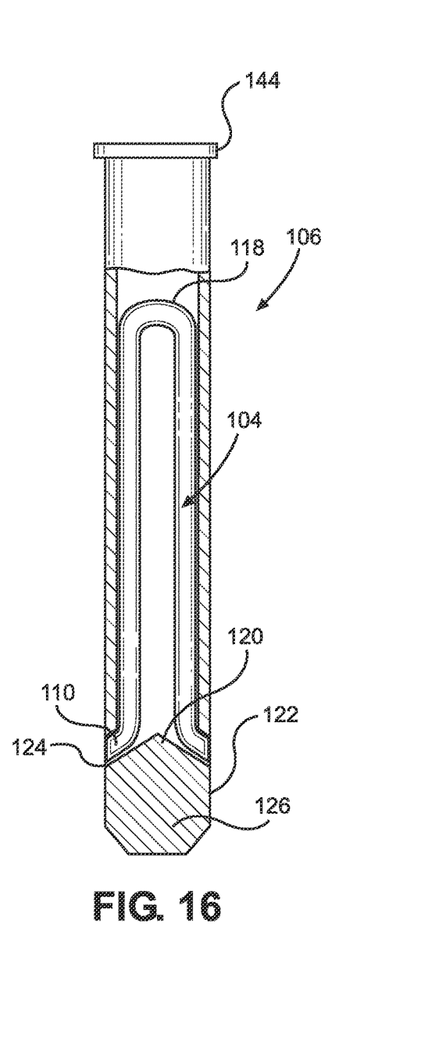
FIG. 16 is an alternate embodiment of the separable shank.
Figure 17:
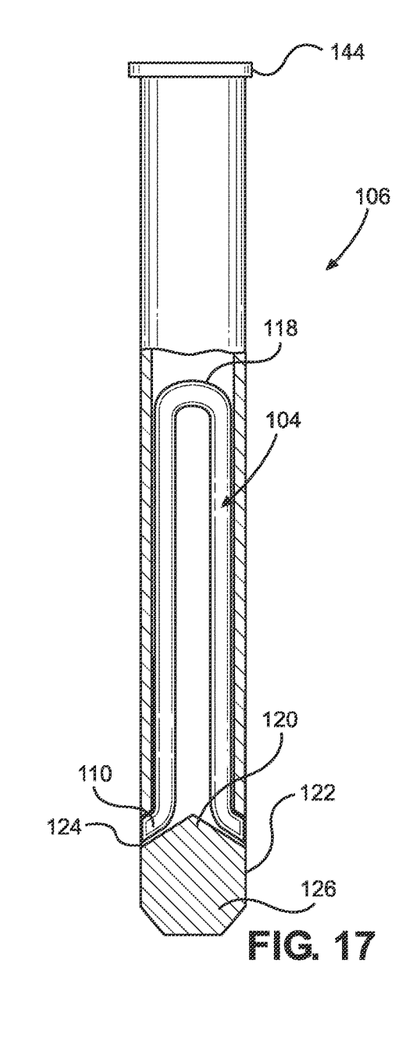
FIG. 17 is an alternate embodiment of the separable shank.

FIGS. 15-17 provide examples of different embodiments of the separable hollow shank 106 embodiment of FIG. 11. A length of the hollow shank 106 may vary as necessary to match the corresponding substructure. The length of the hollow shank 106 should ideally be less than a depth of the substructure 4, as this fastener is not adapted to pierce through a metal sheet of the structural basement. The staple 104 corresponding to each hollow shank 106 may be varied in length or size, as needed. The staple 104 of FIGS. 15-17 has been shown as remaining the same in size for ease of comparison between different lengths of the hollow shank 106.

We claim:
1. An induction roofing fastener, comprising:
an anchor plate having a flat raised portion, an inner sloped portion, an outer sloped portion, and a depressed portion, wherein the inner sloped portion is secured circumferentially about the depressed portion, the raised portion is secured circumferentially about the inner sloped portion, and the outer sloped portion is secured circumferentially about the raised portion, and the depressed portion having a centrally located hole;
a staple having two or more free ends;
a hollow shank having a longitudinally extending hollow shank body with a flange located at a first end of the hollow shank body and one or more openings located along a free end of the of the hollow shank body opposite to the first end, the flange having a flange raised portion and a flange sloped portion secured circumferentially about the flange raised portion, the flange extending perpendicularly from the first end relative to the longitudinally extending hollow shank body, and the flange having a flange opening located in the flange raised portion continuous with the one or more openings via the hollow shank body;
a heat-activated adhesive layer peripherally applied to the induction roofing fastener along the raised portion of the anchor plate and centrally applied along the flange raised portion of the flange, the heat-activated layer applied pre-installation of the induction roofing fastener; and
one or more heat sink orifices provided on the anchor plate,
wherein the staple is insertable through the flange opening and within a hollow portion of the hollow shank body and two or more free ends of the staple are extendable through the one or more openings along the free end of the hollow shank, and
wherein the hollow shank is configured to be inserted through the centrally located hole of the anchor plate about the free end such that the flange sloped portion of the hollow shank contacts the depressed portion of the anchor plate, and the hollow shank is oriented perpendicularly to the anchor plate,
wherein the induction roofing fastener, after installation into a roofing surface and application of a single-ply roofing layer laid over top, is configured to be directly secured to the single-ply roofing layer via application of heat through the single-ply roofing layer to the heat-activated adhesive layer,
wherein the one or more heat sink orifices are located entirely on the flat raised portion of the anchor plate.

2. The induction roofing fastener of claim 1, further comprising a piercing surface along the free end of the hollow shank.

3. The induction roofing fastener of claim 1, further comprising a bifurcation surface within the hollow shank body.

4. The induction roofing fastener of claim 1, wherein the hollow shank body is rectangular and has a piercing surface along the free end of the of the hollow shank body.

5. The induction roofing fastener of claim 1, wherein the one or more heat sink orifices provide heat dissipation during the application of heat to the induction roofing fastener and are mechanical attachment points for the single-ply roofing layer slightly melted during the application of heat.

6. A method of installing a single-ply roofing layer to a substructure, comprising:
   inserting an induction roofing fastener into a substructure layer without piercing a structural layer, the induction roofing fastener comprising
   an anchor plate having a raised bonding surface and an adhesive layer atop the bonding surface;
      a staple having two or more free ends oriented in a same direction; and
      a hollow shank contacting, and extending perpendicularly away from, the anchor plate and having one or more openings along a free end,
      wherein a plurality of heat sink orifices are provided along the bonding surface,
      wherein the staple is insertable within a hollow portion of the hollow shank and the two or more free ends of the staple are extendable through the one or more openings along the free end of the hollow shank;
   depressing the staple within the hollow portion of the hollow shank such that the two or more free ends of the staple are extended through the one or more openings along the free end of the hollow shank and into the substructure layer;
   covering the anchor plate with the single-ply roofing layer such that the adhesive layer contacts the single-ply roofing layer;
   applying heat to a portion of the single-ply roofing layer directly covering the anchor plate; and
   allowing heat to dissipate from the heat sink orifices to bond the single-ply roofing layer and anchor plate together,
   wherein the single-ply roof layer partially melts within each heat sink orifice as heat is allowed to dissipate.

7. The method of claim 6, wherein the induction roofing fastener is inserted into a substructure layer that is not fully set.

8. The method of claim 7, further comprising, after depressing the staple within the hollow portion, allowing the substructure layer to fully set before covering the anchor plate with the single-ply roofing layer.

9. The method of claim 7, further comprising, after depressing the staple within the hollow portion, covering the anchor plate with the single-ply roofing layer before the substructure layer is fully set.

10. The method of claim 6, wherein the substructure is a homosote deck, an autoclaved concrete deck, a tectum deck, a lightweight insulating concrete deck, a cementitious wood deck, or a gypsum deck.

11. The method of claim 6, wherein the induction roofing fastener further comprises an opening in the anchor plate being contiguous with the hollow portion of the hollow shank and continuous with the one or more openings of the hollow shank.

12. The method of claim 6, wherein the induction roofing fastener further comprises a central opening in the anchor plate;
   an insertion opening along a connection end of the hollow shank, the connection end oriented oppositely from the free end along a longitudinal length of the hollow shank; and
   a flange arranged around the insertion opening,
   wherein the hollow shank is insertable through the central opening of the anchor plate about the free end and securable to the anchor plate about the flange.

13. The method of claim 6, wherein the induction roofing fastener further comprises
   a piercing surface along the free end of the hollow shank; and
   a bifurcation surface within the hollow portion oriented toward the free end of the hollow shank.

14. An induction roofing fastener, comprising:
   an anchor plate having a flat raised portion, an inner sloped portion, an outer sloped portion, and a depressed portion, wherein the inner sloped portion is secured circumferentially about the depressed portion, the raised portion is secured circumferentially about the inner sloped portion, and the outer sloped portion is secured circumferentially about the raised portion, and the depressed portion having a centrally located hole;
   a staple having two or more free ends;
   a hollow shank having a longitudinally extending hollow shank body with a flange located at a first end of the hollow shank body and one or more openings located along a free end of the of the hollow shank body opposite to the first end, the flange having a flange raised portion and a flange sloped portion secured circumferentially about the flange raised portion, the flange extending perpendicularly from the first end relative to the longitudinally extending hollow shank body, and the flange having a flange opening located in the flange raised portion continuous with the one or more openings via the hollow shank body;
   a heat-activated adhesive layer peripherally applied to the induction roofing fastener along the raised portion of the anchor plate and centrally applied along the flange raised portion of the flange, the heat-activated layer applied pre-installation of the induction roofing fastener; and
   one or more heat sink orifices provided on the anchor plate,
   wherein the staple is insertable through the flange opening and within a hollow portion of the hollow shank body and two or more free ends of the staple are extendable through the one or more openings along the free end of the hollow shank, and
   wherein the hollow shank is configured to be inserted through the centrally located hole of the anchor plate about the free end such that the flange sloped portion of the hollow shank contacts the depressed portion of the anchor plate, and the hollow shank is oriented perpendicularly to the anchor plate,
   wherein the induction roofing fastener, after installation into a roofing surface and application of a single-ply roofing layer laid over top, is configured to be directly secured to the single-ply roofing layer via application of heat through the single-ply roofing layer to the heat-activated adhesive layer, wherein the hollow shank body is rectangular and has a piercing surface along the free end of the of the hollow shank body.

* * * * *